UNITED STATES PATENT OFFICE.

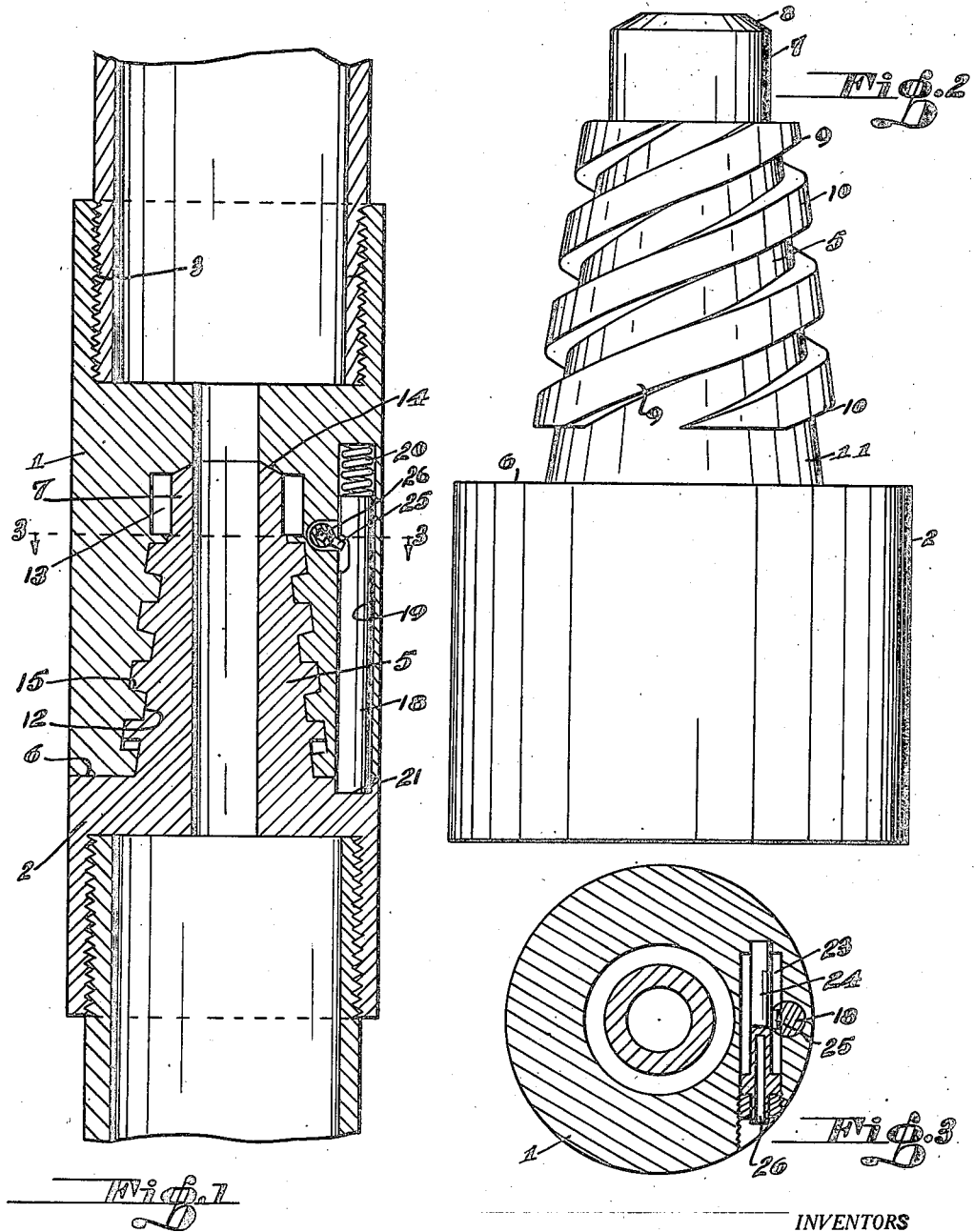

CHARLES B. REYNOLDS AND CLARENCE D. REYNOLDS, OF WHITTIER, CALIFORNIA.

PIPE AND TOOL JOINT.

1,407,335.    Specification of Letters Patent.    Patented Feb. 21, 1922.

Application filed June 2, 1920. Serial No. 386,020.

*To all whom it may concern:*

Be it known that we, CHARLES B. REYNOLDS and CLARENCE D. REYNOLDS, citizens of the United States, residing at Whittier, in the county of Los Angeles and State of California, have invented new and useful Improvements in Pipe and Tool Joints, of which the following is a specification.

This invention is a joint for pipes, tool rods and the like, and has for its object the provision of a joint wherein a single rotation of the joint sections will cause engagement thereof.

It is a further object of the invention to provide a locking pin arranged to automatically lock the joint sections when the latter have been turned a full rotation or turn relative to one another for causing engagement of the joint sections.

The invention will be readily understood from the following description of the accompanying drawings, in which—

Figure 1 is a longitudinal section through a joint constructed in accordance with the invention.

Fig. 2 is an enlarged side elevation of the pin end of the joint.

Fig. 3 is a transverse section on the line 3—3 of Fig. 1.

The improved joint consists of two sections, 1 and 2, forming the box end and the pin end of the joint respectively. These joint sections are, preferably, circular in cross section and may be provided with usual threaded recesses 3 at their outer ends arranged to engage similar threaded ends of pipes, tool rods and the like, adapted to be connected by the improved joint.

The section of the joint carrying the pin end is shown as provided with a longitudinal projecting tapering pin 5 of less diameter than that of the joint section so as to form the lateral shoulder 6. The end of the tapering pin is provided with a cylindrical projection 7, preferably, of less diameter than that of the end of the tapering pin and the end of this cylindrical projection is provided with a beveled ground face 8. A plurality of threads are provided upon the surface of the tapering pin 5, so arranged that one complete rotation of the sections of the joint will cause complete engagement between the joint sections. For this purpose two threads are shown provided upon the tapering pin, these threads being shown as the square threads 9 and 10 respectively. These threads, preferably, terminate at their outer end at the shoulder formed at the junction of the tapering pin with the cylindrical projection 7 and at their inner end the threads preferably terminate short of the base of the tapering pin to provide a clearance space 11 at the base of the threads.

The section of the joint forming the box end is shown as provided with an axial tapering recess 12 of a length equal to the length of pin 5, said recess terminating within the joint section in an annular recess 13 of somewhat greater diameter than the cylindrical projection 7 upon the pin end of the joint. This annular recess is of the same depth as the cylindrical projection 7 and is provided at the bottom thereof with a ground joint surface 14 arranged to engage the ground surface 8 upon the pin end of the joint. The tapering recess provided in the box end of the joint is internally threaded as shown at 15 to correspond with the threads upon the pin end of the joint, it being understood that the diameter of said recess and of the internal threads is such as to receive the threaded pin end and form a relatively close connection therewith.

As previously stated the double threaded connection between the pin and box ends of the joint is so arranged that when the pin is inserted in the box, one complete rotation of the joint sections relative to one another will completely connect the threaded connection. When the joint sections are thus united, the ground face 8 will seat upon the ground face 14 to provide a tight ground joint between the two sections of the joint. It will also be observed that the clearance spaces 13 and 11 will prevent jamming of the threads of the joint connection.

When the joint sections have thus been united a locking pin is arranged to releasably retain the sections in connected engagement. The locking pin is shown at 18 received within a recess 19 provided in the box end of the joint. This locking pin is urged outwardly by the spring 20 and its outer end is arranged to engage a recess 21 so positioned in the end of the shoulder 6 of the pin end of the joint as to have the locking pin received therein, when the two joint sections have been completely rotated relative to one another for connecting the joint sections. The locking pin is, preferably, provided with a longitudinal recess 22 in one side thereof, said recess being in lateral alinement with a transverse recess 23 extending into the box end of the joint. A pin 24 is journaled in recess 23, said pin being provided with a lateral lug 25 received within the longitudinal recess 22. The pin 24 is provided at its end with a suitable opening 26, arranged to receive a suitable wrench head. By this arrangement the pin 24 will hold locking pin 18 against longitudinal displacement from the box end of the joint while permitting sufficient longitudinal movement of said locking pin to cause locking engagement between the same and the recess 21 provided in the pin end of the joint.

Thus it will be seen that we have provided a construction wherein a complete rotation of the sections of the joint relative to one another is adapted to connect the sections of the joint, the locking pin, previously described, being arranged to lock the joint sections in their connected position. By engaging the wrench in the end of pin 24, the latter may be readily turned so as to disengage the locking pin and thereby permit reverse rotation of the joint sections relative to one another for disconnecting the joint.

Various changes may be made without departing from the spirit of the invention as claimed.

What is claimed is:

1. A joint comprising male and female members having a tapering plural threaded connection between the same arranged whereby a single complete rotation of said members relative to one another will cause engagement of said threaded connection, a ground joint between the end meeting surfaces of said members, clearance spaces at the ends of said threaded connection, and a locking pin for releasably engaging said members when thus connected.

2. A joint comprising male and female members having a threaded connection between the same arranged whereby a single complete rotation of said members relative to one another will cause engagement of said threaded connection, a ground joint between the end meeting surfaces of said members, and clearance spaces at the ends of said threaded connection, and a locking pin for releasably engaging said members when thus connected.

In testimony whereof we have signed our names to this specification.

CHARLES B. REYNOLDS.
CLARENCE D. REYNOLDS.